J. F. MONTINE.
OVERHEAD TRANSPORTATION SYSTEM.
APPLICATION FILED NOV. 13, 1916.

1,232,367.

Patented July 3, 1917.
4 SHEETS—SHEET 1.

Joseph F. Montine
INVENTOR.

BY
ATTORNEYS.

J. F. MONTINE.
OVERHEAD TRANSPORTATION SYSTEM.
APPLICATION FILED NOV. 13, 1916.

1,232,367.

Patented July 3, 1917.
4 SHEETS—SHEET 2.

Joseph F. Montine
INVENTOR.

BY
ATTORNEYS.

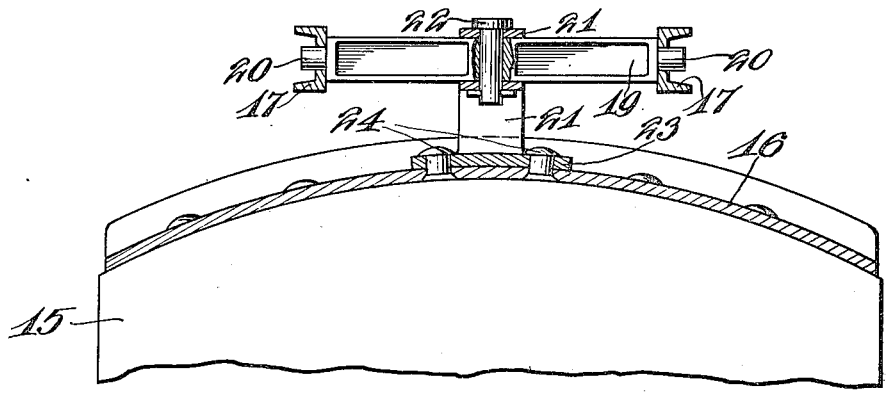
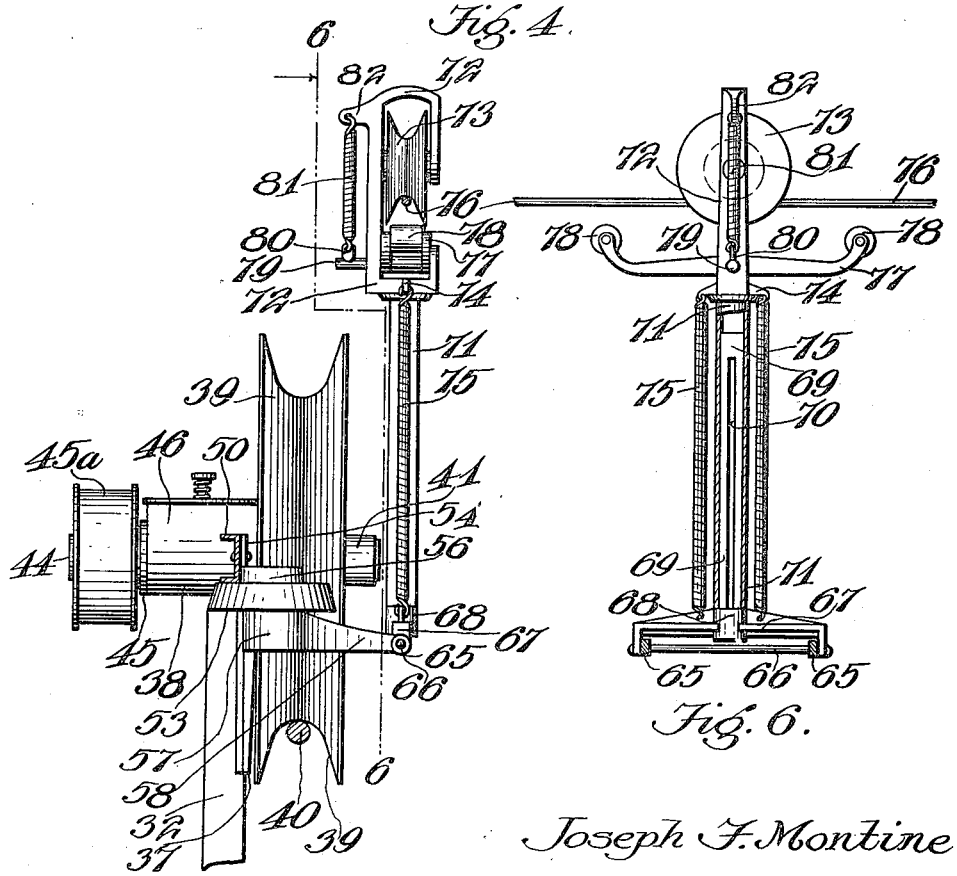

J. F. MONTINE.
OVERHEAD TRANSPORTATION SYSTEM.
APPLICATION FILED NOV. 13, 1916.
1,232,367.
Patented July 3, 1917.
4 SHEETS—SHEET 4.
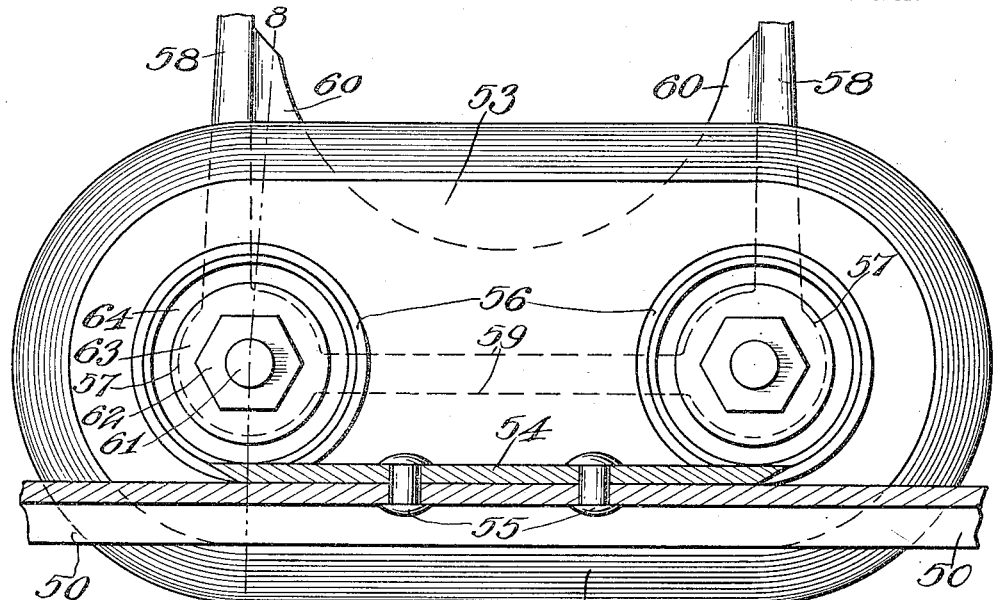
Fig. 7.
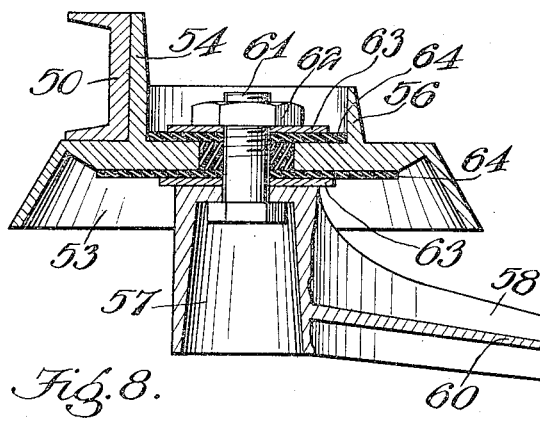
Fig. 8.
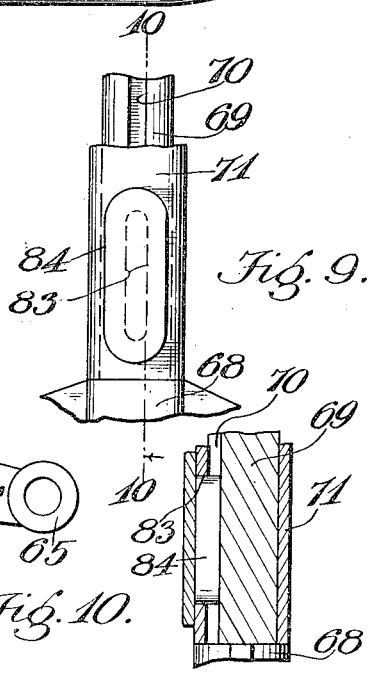
Fig. 9.
Fig. 10.
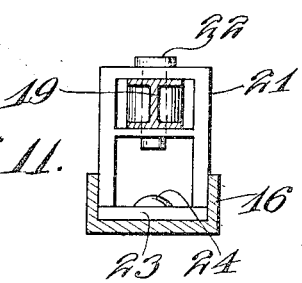
Fig. 11.
Joseph F. Montine
INVENTOR.
BY
ATTORNEYS.

UNITED STATES PATENT OFFICE.

JOSEPH F. MONTINE, OF NEVINVILLE, IOWA.

OVERHEAD TRANSPORTATION SYSTEM.

1,232,367. Specification of Letters Patent. Patented July 3, 1917.

Application filed November 13, 1916. Serial No. 131,097.

*To all whom it may concern:*

Be it known that I, JOSEPH F. MONTINE, a citizen of the United States, residing at Nevinville, in the county of Adams and State of Iowa, have invented new and useful Improvements in Overhead Transportation Systems, of which the following is a specification.

This invention relates to apparatus for collecting and delivering mail, parcels, etc., along a route, the same comprising an elevated track on which is mounted a truck driven by an electric motor and carrying a receptacle containing the mail matter, merchandise, etc., the motor obtaining current from an overhead conductor wire by means of a trolley wheel running thereon.

The invention relates more particularly to the truck and the support for the current collector, and its objects are to provide a truck of novel and improved construction, and to provide a mounting for the current collector whereby it is kept in proper position with respect to the trolley wire at all times and under all conditions of the track and trolley wire.

The objects stated are attained by means of a combination and arrangement of parts to be hereinafter described and claimed, and in order that the same may be better understood, reference is had to the accompanying drawings, forming a part of this specification.

In the drawings,

Figs. 2, 3, 4 and 5 are sections on corresponding lines of Fig. 1;

Fig. 6 is a section on the line 6—6 of Fig. 5;

Fig. 7 is an enlarged section on the line 7—7 of Fig. 1;

Fig. 8 is a section on the line 8—8 of Fig. 7;

Fig. 9 is an enlarged elevation of a detail;

Fig. 10 is a section on the line 10—10 of Fig. 9;

Fig. 11 is a section on the line 11—11 of Fig. 2, and

Figure 1:
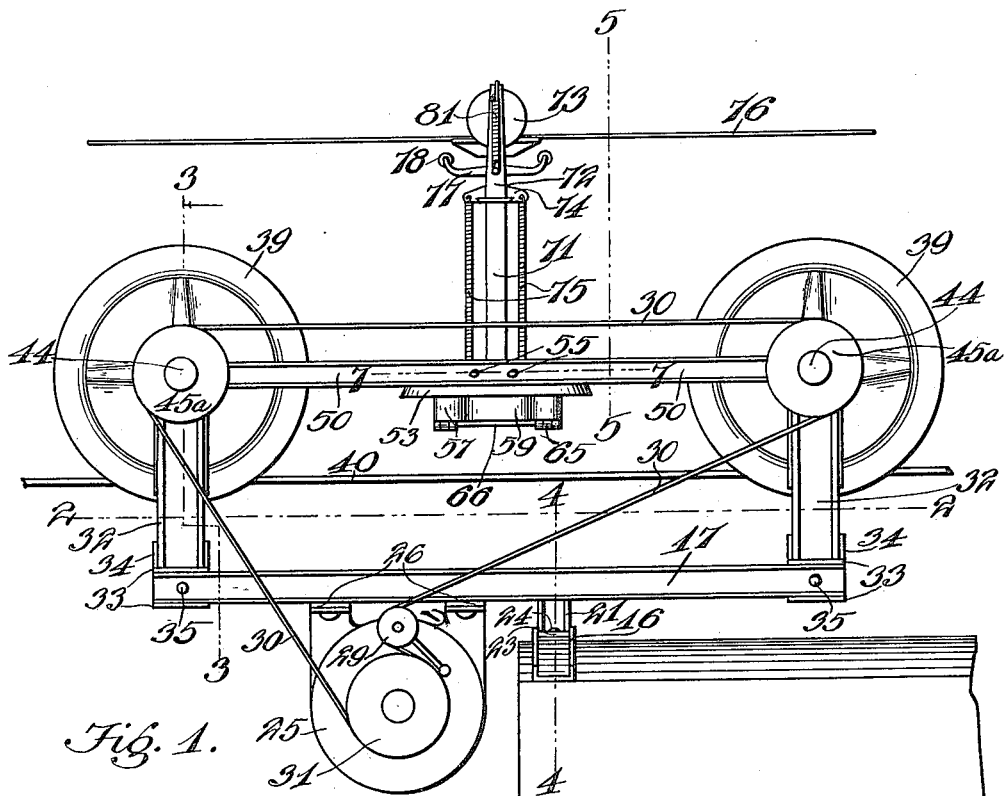
Figure 1 is an elevation of one end of the apparatus.
Figure 12:
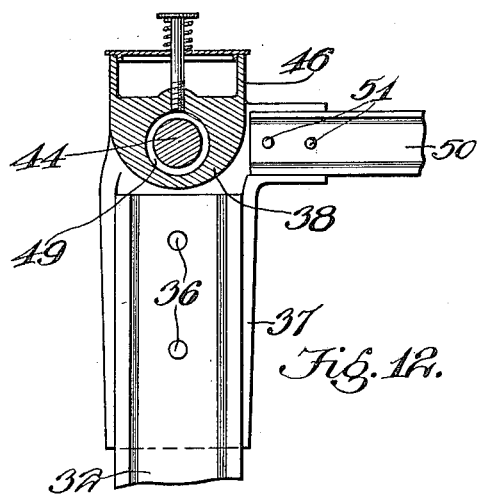
Fig. 12 is a section on the line 12—12 of Fig. 3.
Figure 2:
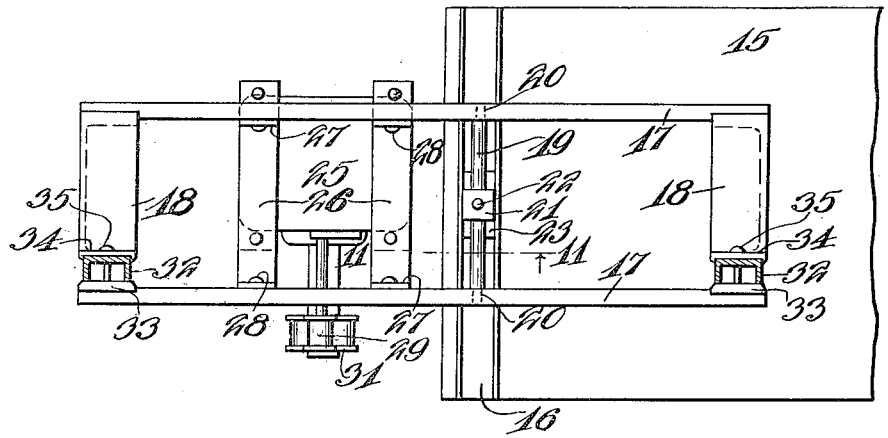

Referring specifically to the drawings, 15 denotes a car or receptacle in which mail or other commodities to be transported over the cable line are deposited. Only one end of the receptacle is shown suspended from the cable, forming the overhead track, it being understood that the other end will be suspended in the same manner, but only one motor will be provided. As shown in Figs. 1, 2 and 4, an arched channel bar 16 is fastened over the curved roof of the receptacle, and above the latter is the supporting frame of the motor unit. This frame comprises two laterally spaced channel bars 17, having their channels outward, and extending longitudinally of the receptacle. The ends of the frame are in the form of deeply recessed cross bars 18. At an intermediate point, the side members 17 of the frame carry a cross bar 19, having journals 20 at its ends which are supported in apertures in said side members, as shown in Fig. 4. The bar 19 is of I-section, and takes a hanger in the form of a yoke block 21 by means of a vertical pin 22. The yoke block 21 has a bottom extension in the form of a plate 23, which is fastened to the channel bar 16 over the receptacle roof by rivets 24. The journals at 20 and the vertical pivot 22 give the receptacle freedom to swing sidewise or rock without imposing strain upon the motor frame.

The motor 25 is hung from two cross plates 26, extending between the side bars 17, and located beneath the frame, the plates having upstanding flanges 27, which are secured to the inside of the bars 17 by rivets 28. As shown in Figs. 1 and 2 the motor carries an idler pulley 29, which serves to tighten a belt 30, which passes over a pulley 31 on the motor shaft. The motor is an electric motor of any suitable type.

That frame member 17, which is above the pulley 31 takes, at each end, two vertical posts composed of channel bars 32. These bars 32 are positioned on the inner side of the frame member 17, taking a channeled washer 33, on one side, and a terminal jaw 34 of the bars 18 on the other side; and finally being secured by a cross rivet or bolt 35. The posts 32 support the wheel assemblies of the motor carriage, and as the parts associated with each post are identical, a description of one assembly will suffice.

To the top of post 32 is secured by rivets 36, a bracket arm 37 having at the top a bearing 38. The wheel 39 has a grooved periphery for travel on the cable 40, and its hub 41 is journaled on a ball bearing 42. The inner ring of the ball bearing is fast to the bearing 38, while the outer one is fast to the wheel hub, the latter being in turn secured by a cross pin 43 to a shaft 44. This shaft has a collar 45 outside the bearing 38, and a pulley 45ᵃ for connection with the motor 25 through a belt 30. Between the wheel and the pulley, the bearing 38 has a large oil cup 46 having two ducts 47 to the center. One of the ducts opens on the shaft 44 through a sleeve 48 surrounding the latter and forming a bearing for the shaft at one end, the ball bearing sufficing for the other end. Between the sleeve 48 and the outer end of the hub 41 an annular space 49 is left between the shaft 44 and bearing 38, so that oil can pass outward and reach the ball bearing 42, as clearly shown in Fig. 3. At the upper part of this view the web of the wheel 39 is shown in section, while at the lower part a section through a spoke is taken, showing that the spokes are enlargements of the web.

Figure 3:
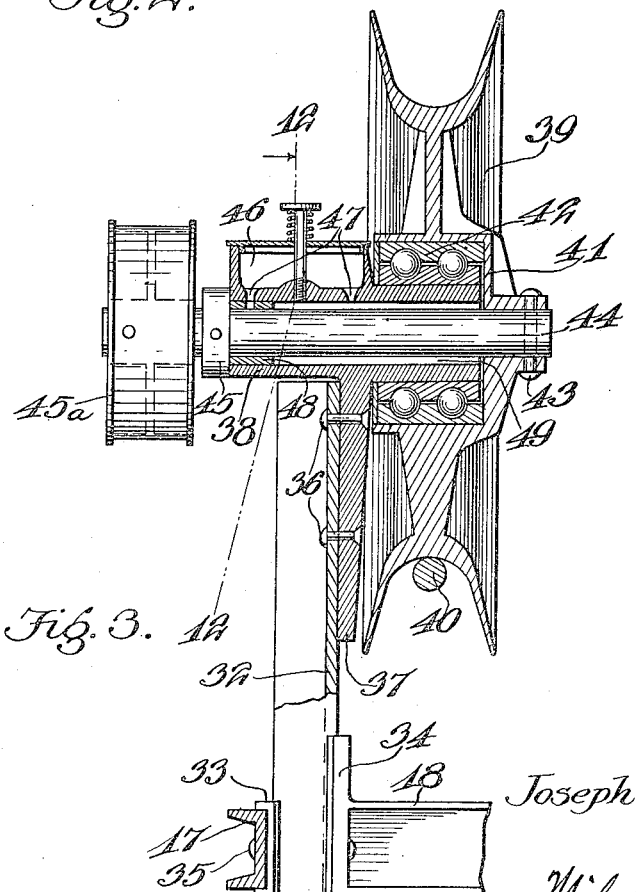

As the apparatus has two wheels 39 located one behind the other on the cable 40, there will be a tendency for the receptacle 15 to swing sidewise toward the right, as viewed in Fig. 3, slightly, on account of being supported from a point to the left of the wheels. This tendency is counteracted by placing the motor 25 over to the right, as shown in Fig. 2, so that its weight will produce a balance. The wheel tandem is maintained in rigid relation by a horizontal spacing bar 50 of channel section, the ends of which are riveted at 51 to the side extensions 52 of the wheel bearings 38.

Associated with the motor carriage, is a current collector which will now be described. From the inner or flat side of the spacer bar 50 is supported a metal hood 53 of nearly elliptical form and having an upstanding rib 54, which lies next to the bar 50, and is secured thereto by rivets 55. The hood 53 has two integral cups 56 on its upper surface, these being tangentially connected and reinforced by the rib 54 aforementioned. Under the hood, and below each cup 56 is an inverted cup 57 forming a part of a horizontal bracket member having two spaced transverse arms 58, a longitudinal arm 59 connecting the cups 57, and a broad web 60 connecting these three arms. A bolt 61 is passed up through each cup 57 and into the cup 56 to take a nut 62 in the latter cup, plain washers 63 and insulation washers and bushings 64 being interposed to prevent electrical connection between the bracket member and the hood. The cups 56 will be packed with insulating wax to prevent water from short circuiting the insulated parts; and the hood serves to shed rain water for the same purpose.

As shown in Figs. 5 and 6, the extremities of the bracket arms 58 are formed with bearings 65 for a cross rod 66, which supports a yoke bar 67. This yoke bar is reinforced at the middle, as shown at 68, and has an upstanding stem 69 of round cross section, and provided with a longitudinal groove 70. Over this stem is slidable a sleeve 71 depending from a trolley harp 72, which carries the trolley wheel 73. The sleeve 71 and the stem 69 form a trolley pole, and the former has two side lugs 74, from which depend two coiled springs 75, the lower ends of which are secured to the yoke bar 67, the object of these springs being to maintain the stem 69 and the sleeve 71 in telescoped relation normally. With the trolley wheel 73 on the wire 76, it will be seen that lateral deviation of the wire 76 from the cable 40 will be equalized by the pivot joint at the cross-rod 66, while vertical variations will be taken up yieldably by the telescopically connected stem 69 and sleeve 71.

Below the trolley wheel 73 is located a guard 77 for same, the object of the guard being to prevent the wheel from jumping the wire. The guard is composed of two arms extending forward and rearward, respectively, and carrying guard rollers 78 at their outer ends. These guard rollers strike the wire 76 before the trolley wheel is clear of the latter. The arms 77 are carried by a rock shaft 79 so that the guard rollers may dodge the supporting devices for, and joints in, the wire 76. The rock shaft 79 has a vertical lug 80 to which is fastened the lower end of a vertical coiled spring 81, the upper end of the spring being secured to a lug 82 at the top of the trolley harp 72. It will be seen that the tension of the spring 81 will keep the guard level normally, but will permit it to duck under a support for the wire, or an enlargement at a joint in the same.

In the sleeve 71 is an aperture 83 in which latter and in the groove seats a key 84. This key, while having a snug fit in the aperture, is loose in the groove so that it may slide thereon, thereby permitting free relative longitudinal movement of the sleeve 71 and the stem 69, but preventing said parts from rotating relative to each other.

It will be understood, of course, that the motor 25 obtains its current supply from the wire 76, the wiring being arranged in the ordinary manner, and which, therefore, need not be illustrated.

I claim:

The combination of a motor truck adapted to run on an elevated track and having laterally spaced side frame members, a cross bar extending between said frame members and journaled at its ends thereto, a hanger carried by the cross bar and having a vertical pivotal connection therewith, and a receptacle supported by the hanger beneath the truck.

In testimony whereof I affix my signtaure.

JOSEPH F. MONTINE.